(12) United States Patent
Poloni et al.

(10) Patent No.: US 6,311,829 B1
(45) Date of Patent: Nov. 6, 2001

(54) DEVICE TO SEPARATE ROLLED BARS

(75) Inventors: Alfredo Poloni, Fogliano di Redipuglia; Giuseppe Bordignon, Bicinicco; Andrea De Luca, Remanzacco, all of (IT)

(73) Assignee: Danieli & C. Officine Meccaniche S.p.A, Buttrio (IT)

( * ) Notice: Subject to any disclaimer, the term of this patent is extended or adjusted under 35 U.S.C. 154(b) by 0 days.

(21) Appl. No.: 09/529,908
(22) PCT Filed: Oct. 14, 1998
(86) PCT No.: PCT/IB98/01614
  § 371 Date: Apr. 21, 2000
  § 102(e) Date: Apr. 21, 2000
(87) PCT Pub. No.: WO99/21666
  PCT Pub. Date: May 6, 1999

(30) Foreign Application Priority Data
Oct. 24, 1997 (IT) .............................................. UD97A0189

(51) Int. Cl.$^7$ .................................................. B65G 47/26
(52) U.S. Cl. ........................................ 198/459.1; 414/730
(58) Field of Search .................................. 198/459.4, 434, 198/459.6; 414/730, 739, 746.4

(56) References Cited

U.S. PATENT DOCUMENTS 3,151,747 * 10/1964 McGoogan ........................... 414/730
3,195,737 * 7/1965 Melrose ................................ 414/739
3,373,868 * 3/1968 Missioux et al ...................... 198/434

FOREIGN PATENT DOCUMENTS

3133450A1 * 4/1982 (DE) .
0132855 * 2/1985 (EP) .

* cited by examiner

*Primary Examiner*—Kenneth W. Noland
(74) *Attorney, Agent, or Firm*—Antonelli, Terry, Stout & Kraus, LLP

(57) ABSTRACT

Device to separate rolled bars (12), the bars (12) emerging from the cooling zone and being fed by conveyor means in a direction substantially transverse to the axis of the bars (12) and displaced along a plane by movement means (14), the movement means (14) being separated lengthwise, there being included a counting device (13) to form bundles consisting of a desired and defined number of bars (12), the device comprising a plurality of separator units (15) aligned lengthwise parallel to the bars (12) and each arranged between two adjacent movement means (14), each separator unit (15) comprising at least a pair of distancing pins (16), the distancing pins (16) including a first inactive position lowered and "retracted below the plane ("x") on which the bars (12), lie and a second active position raised and protruding with respect to the plane ("x'") on which the bars (12) lie and inserted between two adjacent bars (12), the distancing pins (16),in the first inactive position, having a reciprocal distance, taken in the direction of feed of the bars (12), less than the reciprocal distance which they have in a second active position.

9 Claims, 3 Drawing Sheets

DEVICE TO SEPARATE ROLLED BARS

FIELD OF THE INVENTION

This invention concerns a device to separate rolled bars as set forth in the main claim.

The device is employed to separate and to reciprocally distance bars arriving from the cooling zone located downstream of the rolling or finishing line, in order to obtain a better and more regular packaging of the bars.

The invention, in cooperation with a counting device, allows a desired number of bars to be arranged in layers or bundles, and prevents errors being made in counting the bars due to the bars being overlapping and twisted along the transport plane.

The device according to the invention is employed in the production by rolling of long products in bars, particularly but not only as they emerge from multi-profile rolling processes.

BACKGROUND OF THE INVENTION

Rolling plants for bars and sections normally include, downstream of the finishing train, a cooling zone and a zone where bundles or layers are formed; here the bars are counted and, when the desired number of bars is reached to form the bundle, they are tied and discharged.

The problem during the process of forming the bundle is that the bars, located on the transport and discharge plane, are often overlapping and twisted lengthwise, particularly when emerging from a multi-profile formation process. It is therefore often very difficult, when the desired number of bars has been counted, to separate the last bar of one layer from the first bar of the next layer, so as to proceed with the tying operation.

Moreover, mistakes in counting are very likely, and therefore the bundle or pack prepared does not have the expected number of bars.

Various separation devices have been proposed which lift at least the leading end of the last bar of one layer with respect to the plane of feed, in order to separate it from the adjacent bar.

However it is sometimes difficult to lift, as it is not possible to separate bars which are overlapping and twisted together for a considerable part of their length.

Together with possible mistakes in the counting, this may lead to the formation of layers which do not have the same number of bars.

Furthermore, the lifting of the bar itself with respect to the plane of feed causes it to be axially misaligned.

Other solutions have proposed to use blades or movable arms which are inserted into the gap between two adjacent bars in order to separate them.

If these means manage to separate the bars in correspondence with the leading ends, they cannot in any case eliminate twisting and overlapping lengthwise to the bars themselves.

These problems therefore cause non-uniform and unhomogeneous layers to be formed, which creates considerable problems in the following step of packaging the bundles of bars.

The risk of this situation developing is even greater in the case of multi-profile rolling where the bars reach the discharge plane even more twisted and overlapping.

GB-A-A.011.217 describes a device suitable to separate a pack consisting of a desired number of bars from a mass of bars arranged on a grid-type transport plane.

The device comprises a plurality of disks, at least partly wedge-shaped, arranged in alignment along the bars and below the transport plane.

The disks are suitable to be moved, with a movement of rotation, from a position underneath the transport plane to a position above the transport plane and progressively inserted between two bars, one after the other from one end of the bars to the other.

The device is not suitable to be employed with bars arriving from a rolling line, and particularly from a multi-profile rolling line, inasmuch as it is not able to separate adjacent bars which arrive twisted and overlapping for a substantial part of their length.

Nor is the device suitable to separate by a certain distance the last bar of the pack to be formed from the first bar of the mass of bars, inasmuch as the wedge shape of the disks allows only a minimum distancing between two adjacent bars.

This can cause problems during counting, and in any case causes handling problems in the operations of tying and packaging of bundles or packs carried out downstream.

The present applicant has designed, tested and embodied this invention to overcome the shortcomings of the state of the art, and to achieve further advantages.

SUMMARY OF THE INVENTION

The invention is set forth and characterised in the main claim, while the dependent claims describe other characteristics of the idea of the main embodiment.

The purpose of the invention is to achieve a device which separates and reciprocally distances adjacent bars arriving from the cooling zone, located downstream of the rolling or finishing train, in order to obtain layers which are uniform and orderly both in number and in the arrangement of the bars.

The separator device according to the invention cooperates with a counting device by means of which the rolled bars, fed by the conveyor means located downstream of the cooling zone, are counted so as to form layers with the desired number of bars.

The counting device also has the function of distancing from each other at least the leading end sections of two adjacent bars.

The conveyor means displace the bars, in a direction orthogonal to their axis, from the position from which they emerge from the cooling zone to the discharge and packaging zone.

The conveyor means define the transport plane of the bars and comprise movement elements which are separated from each other lengthwise.

The separator device according to the invention comprises a plurality of separator units arranged substantially aligned parallel to the rolled bars as they are fed by the conveyor means; the separator units are separated lengthwise and arranged in the spaces between adjacent movement elements.

Each separator unit comprises at least a pair of distancing pins associated with relative drive means.

The distancing pins have at least a first inactive position, retracted below the plane on which the bars are fed, and a second active position wherein they are taken progressively above the plane on which the bars are fed and, by inserting themselves between two adjacent bars, cause them to be progressively separated.

According to a variant, each separator unit comprises two pairs of distancing pins aligned parallel to the bars which have to be separated.

According to the invention, the distancing pins in the first inactive position have a reciprocal distance, taken in the direction of feed of the bars, which is less than the reciprocal distance which they have in the second, active position.

According to a first embodiment of the invention, in the inactive position the distancing pins are arranged aligned substantially parallel to the bar, whereas in the active position they are progressively rotated until they are arranged transverse to the bars as they are inserted between them, and thus thrust them apart.

According to a variant, in the inactive position the distancing pins are arranged near each other and aligned substantially transverse to the bars, whereas, as they move to their active position, they progressively become distanced from each other as they rise between the bars and thrust them apart.

According to the invention, the rolled bars as they arrive from the cooling zone are displaced by the transverse movement elements and taken into correspondence with the separator device.

As they advance, the bars are counted by the counting device and at the same time their leading end sections are at least partly separated.

When the counting device has counted the desired number of bars to form a layer or bundle, the distancing pins move from their inactive position to their active position, inserting themselves into the gap between the last bar counted in the layer and the bar immediately adjacent thereto, and then reciprocally separate them.

In a first embodiment, all the separator units are activated simultaneously.

According to a variant, particularly in the event that the bars arrive with their middle portions and their trailing ends particularly twisted and overlapping, first the leading separator unit is activated, which cooperates with the space between two bars caused by the action of the counting device; and then gradually all the other separator units are activated, so as to give a progressive separation of two adjacent bars, from the leading end to the trailing end.

The layer of bars formed is then sent to the accumulator and packaging means.

By activating the distancing pins the last bar of the layer is distanced from the one immediately adjacent, disentangling any possible twists or overlaps between the two, and therefore ensuring that the bundle will have the required number of bars.

Moreover, separation takes place on the plane of feed of the bars itself, thus limiting the risk of axial misalignment of the bars, and making the formation of the layers quicker and more functional.

BRIEF DESCRIPTION OF THE DRAWINGS

The attached Figures are given as a non-restrictive example and show a preferential embodiment of the invention as follows.

DETAILED DESCRIPTION OF THE PREFERRED EMBODIMENT

Figure 1:
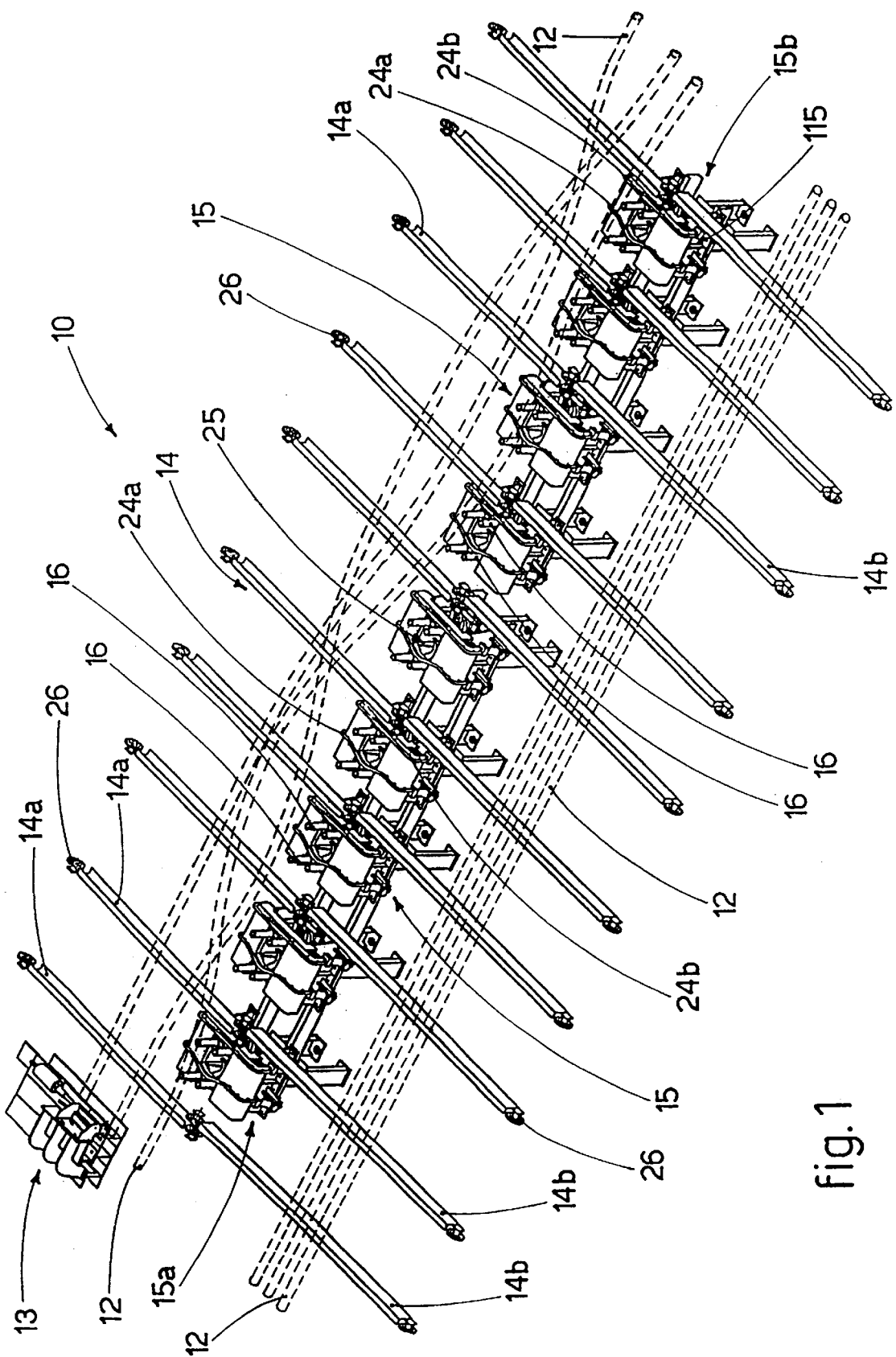
FIG. 1 shows a three-dimensional view of the device to separate layers of rolled bars according to the invention.

With reference to the attached Figures, the reference number 10 denotes generally the separator device for layers 11 of rolled bars 12 arriving from the cooling zone located downstream of the rolling or finishing line, and fed by means of conventional conveyor means which are not shown here.

The separator device 10 cooperates with a counting device 13 of a known type, which is suitable to count the bars 12 fed by the conveyor means so as to form layers or packs of a desired and pre-determined number of bars 12; the layers or packs are then sent to the tying zone to form bundles of bars.

While the counting device 13, for example of the type with an endless screw or similar, is counting the bars 12, it also has the function of separating the respective leading end sections of the bars 12 according to the speed of advance of the transverse movement means 14.

The transverse movement means 14 consist of movement elements 14a, 14b, for example, with a chain, separated lengthwise and driven by respective means 26.

The transverse movement means 14 are suitable to displace the bars 12 transversely to their longitudinal axis.

The separator device 10 according to the invention comprises a plurality of separator units 15 arranged in alignment parallel to the bars 12 as they are fed by the displacement means 26 and in the spaces between adjacent movement means 14 (FIG. 1).

The number of the separator units 15, and therefore substantially the length of the separator device 10, is correlated to the length of the bars 12.

According to one embodiment of the invention, the separator units 15 are movable lengthwise; it is possible to vary their interaxis, and therefore the length of the separator device 10, according to the length of the bar 12.

According to a variant, the separator units 15, or at least some of them, can be excluded and/or de-activated.

Each separator unit 15 comprises, in this case, two pairs of distancing pins 16, aligned lengthwise to each other and therefore parallel to the bars 12.

Figure 2:
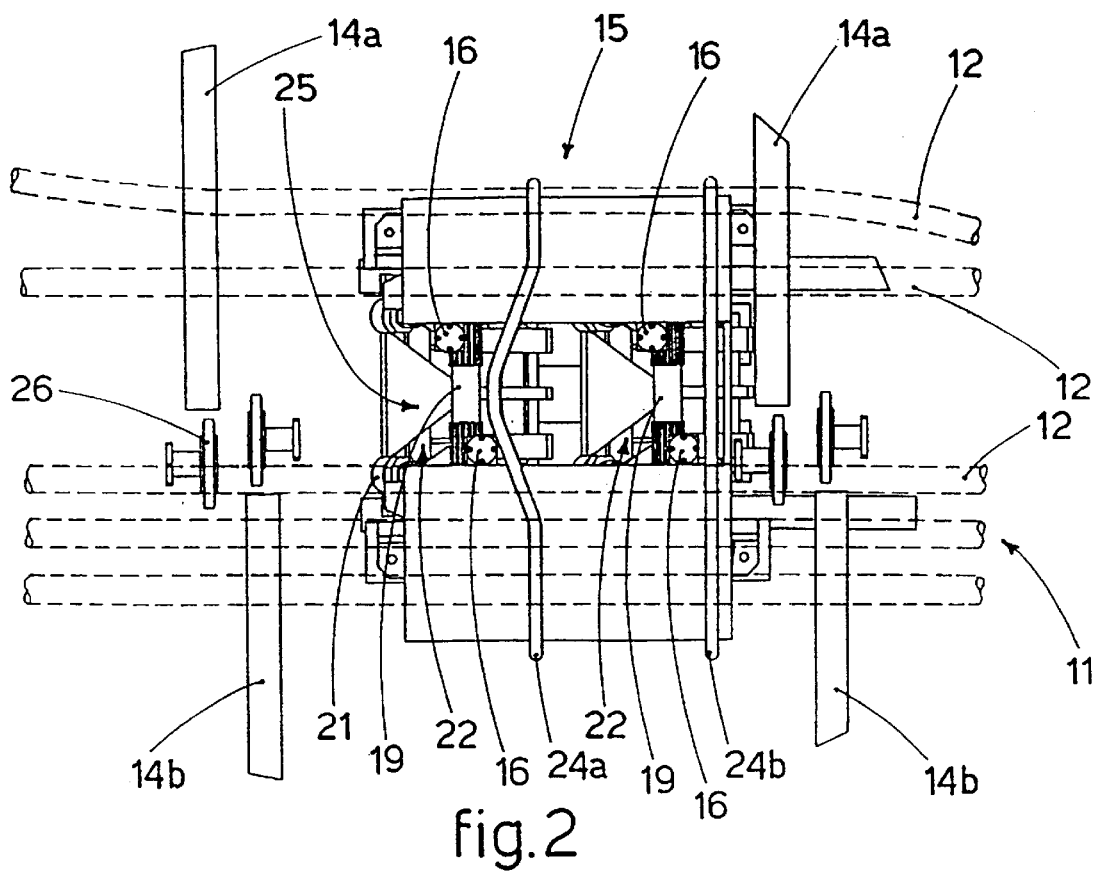
FIG. 2 shows a view from above of a separator unit of the separator device as shown in FIG. 1 with the distancing pins in the active position.
Figure 3:
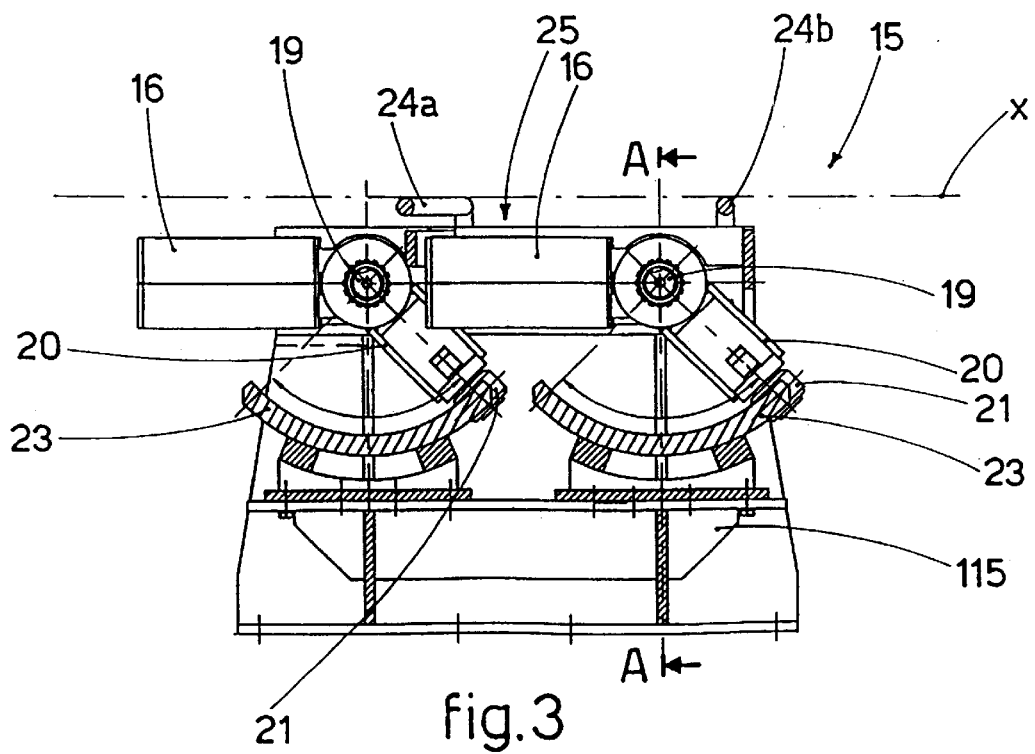
FIG. 3 shows a lengthwise section of a separator unit of the separator device according to the invention with the distancing pins in a lowered position.

The distancing pins 16 of each of the pairs are arranged initially parallel to the bars 12 and can be moved from a first inactive position wherein they are lowered and retracted below the plane "x" on which the bars 12 lie (FIG. 3), to an active position wherein they are aligned with each other in a transverse direction with respect to the bars 12, and wherein they are raised and protrude from the plane "x" (FIGS. 1 and 2).

Figure 4:
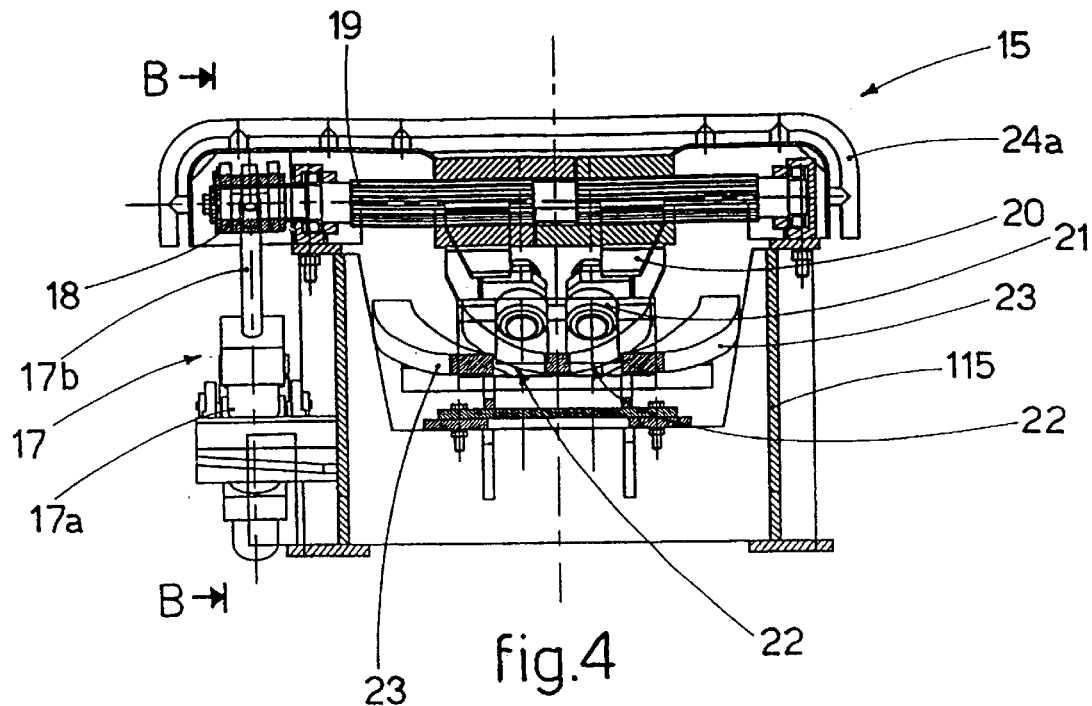
FIG. 4 shows a section from A to A of FIG. 3.
Figure 5:
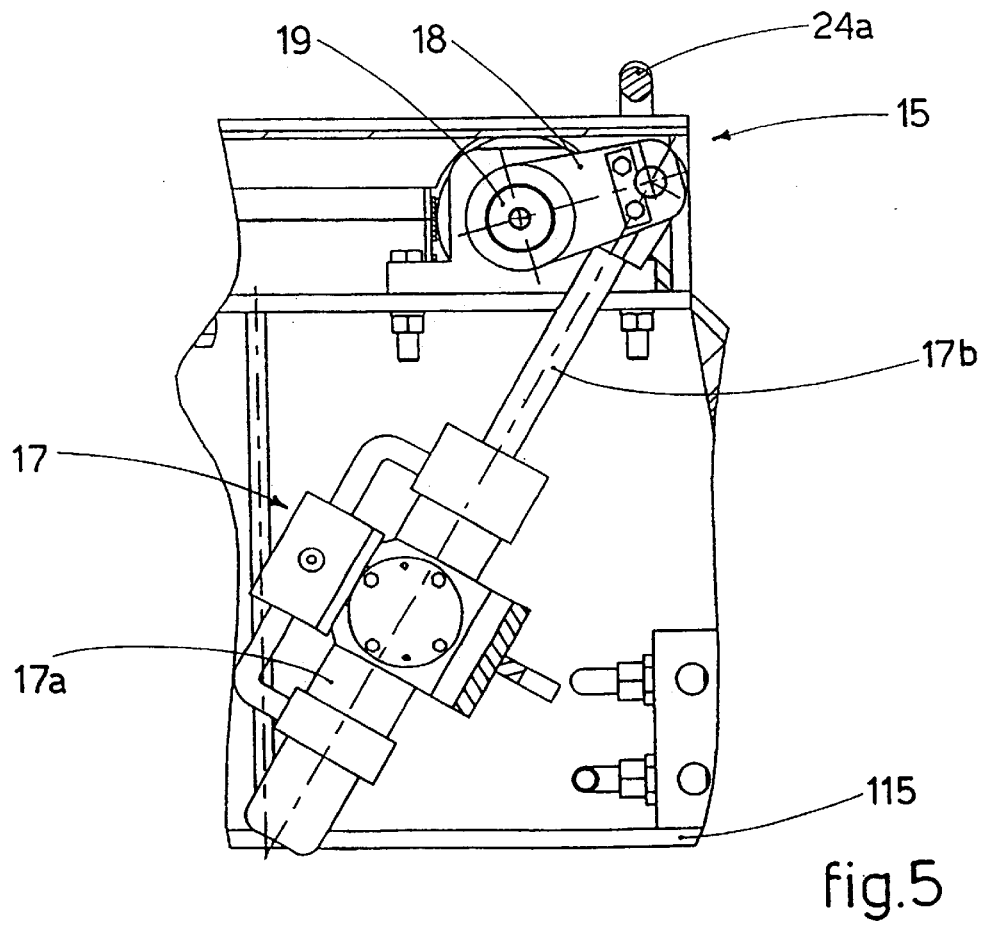
FIG. 5 shows the enlarged section from B to B of FIG. 4.

Each pair of distancing pins 16 is moved by an actuator 17 which has a cylinder 17a constrained to the box-like structure 115 of the separator unit 15 and a stem 17b hinging at the end on a connection section 18 which is rotatably solid with an axially ribbed shaft 19 with which the distancing pins 16 are associated, sliding lengthwise (FIGS. 4 and 5).

Each distancing pin 16 is also associated with a relative support 20 which has at the end a roller 21 which runs inside a mating guide 22 consisting of a shaped section 23 defining an arc of rotation of at least 90°.

According to the invention, as the bars 12 are fed by the conveyor means 14 they move and pass above the separator device 10.

During this step, the distancing pins 16 are in their lowered, inactive position, retracted below the plane "x" on which the bars 12 lie, so as to allow the bars 12 to pass.

When the counting device 13 has counted the number of bars 12 which are needed to form the layer, the distancing pins 16 are displaced into the active position, moving progressively above the plane "x" and inserting themselves into the space between the last bar 12 counted and the bar 12 immediately adjacent thereto.

To be more exact, during this step the stems 17b of the actuators 17 act on the connection section 18 and cause the axially ribbed shaft 19 to rotate.

The rotation of the axially ribbed shaft 19 causes the progressive lifting of the distancing pins 16 with respect to the plane "x", from the horizontal position (FIG. 3) to the vertically erect position (FIGS. 1 and 2).

At the same time, the rotation of the axially ribbed shaft 19 causes the rollers 21 to move along the relative guides 22, thus causing the progressive rotation of the distancing pins 16 from the position of parallel alignment to the position of transverse alignment to the bars 12.

As the distancing pins 16 rotate, and cause the distance between the two pins 16 taken in the direction of feed of the bars 12 to increase, this consequently thrusts apart the two adjacent bars 12, to a maximum value equal to the distance between the pins 16 themselves.

Moreover, the action of the distancing pins 16 allows them to be axially re-aligned so that the bars 12 downstream of the device 10 are parallel and separate.

In one embodiment of the invention the separator units 15 are activated progressively and sequentially from the leading end position 15a to the trailing end position 15b of the separator device 10, thus determining the progressive separation of the two adjacent bars 12 from the leading end to the trailing end thereof.

To be more exact, the distancing pins 16 of the leading separator unit 15a insert themselves into the space between two adjacent bars 12 caused by the counting device 13, the distancing pins 16 of the second separator unit 15 insert themselves into the space caused by the leading separator unit 15a, and so on until the last separator unit 15b.

In the embodiment shown here, each separator unit 15 includes a pair of supporting rods 24a, 24b arranged substantially parallel to and aligned above the movement elements 14a, 14b transverse to the bars 12.

The supporting rods 24a, 24b develop substantially above the aperture 25 through which the distancing pins 16 pass and constitute an auxiliary support for the bars 12 as they pass through, thus impeding interference with the distancing pins 16 in their inactive position.

In this case, the central segment of the front supporting rod 24a is shaped to allow the distancing pins 16 located behind it to rotate and lift.

What is claimed is:

1. Device to separate rolled bars (12) emerging from a cooling zone and being fed by conveyor means in a direction substantially transverse to the axis of the bars (12), said device comprising movement means (14) separated lengthwise for displacing said bars (12) along a plane ("x"), a counting device (13) to form bundles consisting of a desired and defined number of bars (12), the device being characterised in that it comprises a plurality of separator units (15) aligned lengthwise parallel to the bars (12) and each arranged between two adjacent movement means (14), each separator unit (15) comprising at least a pair of distancing pins (16) movable between a first inactive position lowered and retracted below said plane ("x") on which the bars (12) lie, and a second active position raised and protruding with respect to said plane ("x") and inserted between two adjacent bars (12), said distancing pins (16), in the first inactive position, having a reciprocal distance from each other, taken in the direction of feed of the bars (12), less than the distance from each other in the second active position.

2. Device as in claim 1, characterised in that the distancing pins (16), in their lowered, inactive position, are aligned with each other and parallel to the bars (12) and, in their raised active position, are able to progressively assume a position where they are aligned with each other but transversal to the bars (12).

3. Device as in claim 1, characterised in that the distancing pins (16), in their lowered, inactive position, are aligned with each other transversal to the bars (12) and close to each other and, in their raised active position, are able to progressively move away from each other.

4. Device as in claim 1, characterised in that the transition of the distancing pins (16) from the lowered position to the raised position and vice versa is governed by the rotation of a shaft (19) associated with drive means (17).

5. Device as in claim 4, characterised in that the progressive transverse distancing of the distancing pins (16) during the lifting step is functionally governed by the rotation of a sliding element (21) on a relative guide (22) defining a sliding arc of at least 90°, the sliding element (21) being connected rotatably to the shaft (19).

6. Device as in claim 4, characterised in that the drive means (17) consist of actuators.

7. Device as in claim 1, characterised in that each separator unit (15) includes at least a rod (24a, 24b) to support bars (12) arranged substantially transverse to the bars (12).

8. Device as in claim 1, characterised in that the separator units (15) are movable lengthwise parallel to the bars (12).

9. Device as in claim 1, characterised in that said distancing pins (16) between said inactive position to said active position are able to move progressively and sequentially from a separator unit (15a) positioned at the leading end of the bars (12) to another separator unit (15b) positioned at the trailing end.

* * * * *